Oct. 17, 1933.  F. W. TAYLOR  1,931,043
ELECTRICAL IMPEDANCE DEVICE
Filed March 5, 1932
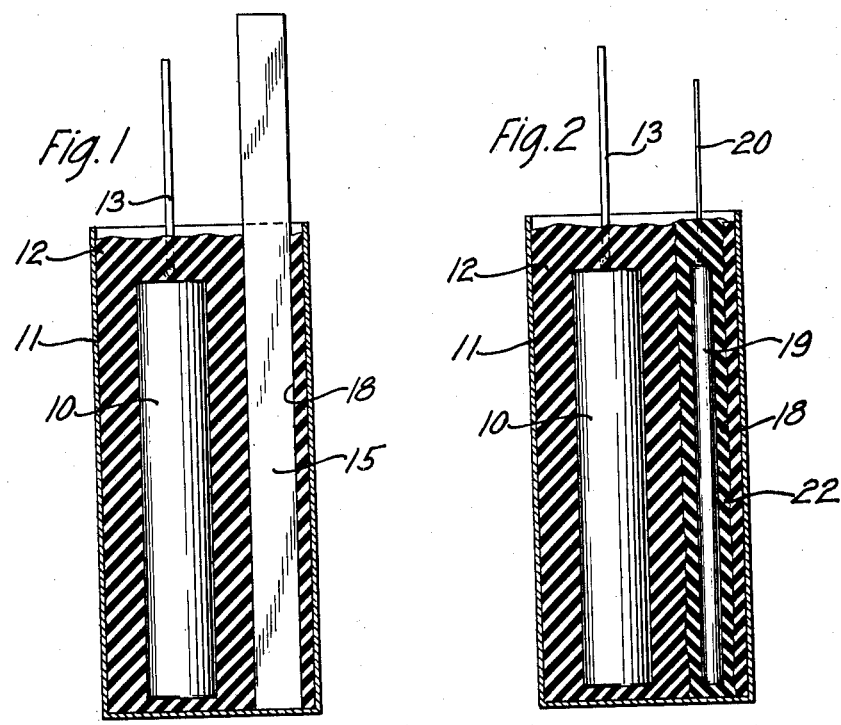
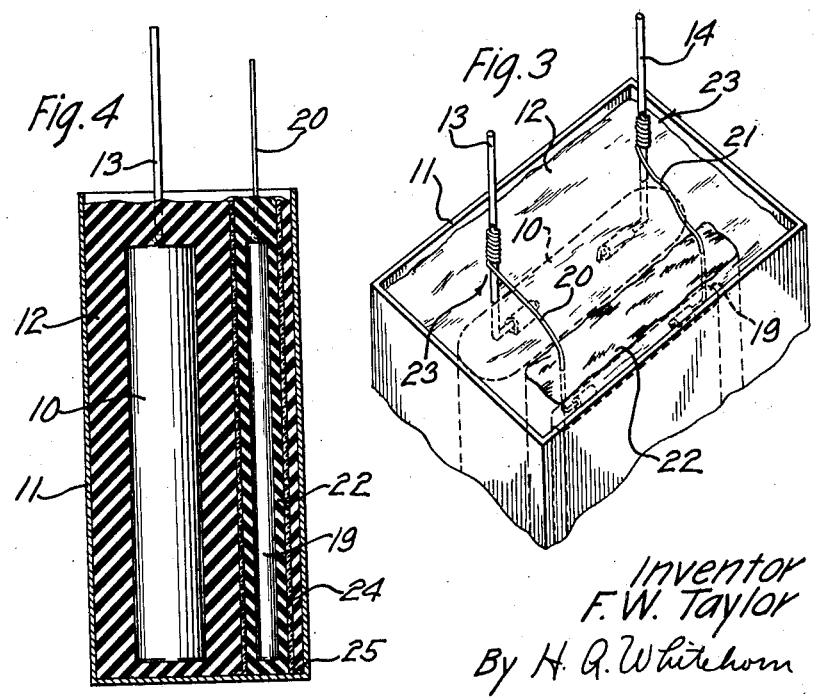
Inventor
F. W. Taylor
By H. Q. Whitehorn Att'y.

Patented Oct. 17, 1933

1,931,043

UNITED STATES PATENT OFFICE 1,931,043

ELECTRICAL IMPEDANCE DEVICE

Frank W. Taylor, Chicago, Ill., assignor to Western Electric Company, Incorporated, New York, N. Y., a corporation of New York Application March 5, 1932. Serial No. 597,017

10 Claims. (Cl. 175—41)

This invention relates to electrical impedance devices and methods of producing them, and more particularly to electrical condensers and methods of producing them.

In the manufacture of electrical condensers, particularly of the fixed type which includes alternate layers of appropriate conducting and dielectric elements, it has been found that the usual potting operation affects the capacity of the condensers, in some cases increasing and in other cases decreasing the capacity to a varying extent so that it has heretofore been difficult or impracticable to produce fixed condensers of a predetermined desired capacity within extremely close limits.

The object of this invention is to provide a simple and economical method of producing electrical devices, a characteristic of which is required to be maintained within very close limits.

In producing electrical devices in accordance with one embodiment of this invention as practiced in connection with the manufacture of electrical condensers of the type hereinbefore described in which the predetermined desired capacities are to be maintained within very close limits, an under-capacity condenser, constructed in the usual manner and a member or bar are sealed in spaced relationship in a molten compound in a suitable container. After the sealing compound has hardened the bar is removed and the capacity of the sealed condenser is measured and an auxiliary condenser of sufficient capacity to bring the combined capacity to within the required close limits is inserted in the space formerly occupied by the bar and connected in parallel with the sealed condenser.

Other objects and advantages of this invention will more fully appear from the following description taken in connection with the accompanying drawing, wherein Figs. 1 and 2 are diagrammatic sectional views of a partially completed electrical condenser illustrating several of the steps practiced in producing the same in accordance with one method of this invention;

Fig. 3 is a diagrammatic fragmentary perspective view of an electrical condenser produced in accordance with said method, and Fig. 4 is a view, similar to Fig. 2, illustrating another embodiment of an electrical condenser of this invention.

The improved method of producing electrical condensers, the capacity of which when completed will be within a permissible variation from a predetermined capacity has been disclosed in connection with the manufacture of wound fixed type condensers comprising alternate strips of conducting and dielectric material such as tinfoil and paper, the condenser being wound in a usual manner.

Referring to the drawing, particularly to Figs. 1 and 2, the numeral 10 indicates a main fixed condenser of the type hereinbefore referred to, constructed to have a capacity which is slightly below a predetermined desired capacity and outside the permissible variation thereof. In practicing the method the condenser is positioned in and sealed in a container 11 by means of a standard potting compound 12 which at the time of inserting the condenser is in a fluid molten condition, terminals 13 and 14 of the condenser extending from the compound. Immediately after or subsequent to the positioning of the condenser 10 in the compound 12 or simultaneously therewith a bar, tube, or hollow member closed at its lower end is inserted in the compound. In the drawing (Fig. 1) a bar 15, preferably of metal, such as copper, is shown as inserted in the compound alongside of the condenser 10 and in spaced relationship with the adjacent vertical walls of the condenser and the container 11, the opposite vertical wall of the condenser also being spaced from the adjacent wall of the container. The main condenser 10 and the bar 15 may be predeterminedly positioned in the container 11, as described above, after the compound 12 has been entered in the container or they may be positioned therein before the compound is poured into the container. Thereafter the compound 12, within which the main condenser 10 is sealed and in which the bar 15 is positioned, is permitted to cool and harden. This usually results in changes in the capacity of the condenser 10 as originally positioned in the compound 12, due to the heating and cooling of the condenser during the potting operation or from other causes. After the compound 12 has cooled and hardened the bar 15 is heated in any well known manner, for instance, by means of a blow torch or by engaging it with a suitable hot plate to cause sufficient heat to be conducted throughout the length of the bar such as will soften the compound 12 contiguous thereto. Thereafter the bar 15 is removed from the surrounding compound 12, thus leaving an aperture or space 18 therein.

The capacity of the potted main condenser 10 is then carefully measured and the deficiency, if any, in the capacity thereof from the predetermined desired capacity is noted and from a supply of auxiliary fixed condensers of graded capacities, which may be similar in construction to the main condenser 10 or of any suitable construction, an auxiliary condenser 19 (Figs. 2 and 3) is selected which is of sufficient capacity to produce by a combination with the main condenser 10 the predetermined desired capacity within the permissible variation therefrom. The selected auxiliary condenser 19 is then inserted in the space 18 formerly occupied by the bar 15, preferably being centered therein and with terminals 20 and 21 of the auxiliary condenser extending above the top of the container 11. Thereafter the auxiliary condenser is sealed in the space 18 by pouring a standard potting compound 22 thereinto, the level of the compound being substantially at the level of the compound sealing the main condenser 10.

It is to be understood that the space 18 may be filled to a proper level with the sealing compound 22 before the auxiliary condenser 19 is inserted in the space instead of inserting and then sealing the condenser as above described. Also, in some cases it may be found desirable to connect and measure the main and auxiliary condensers 10 and 19, respectively, to check the combined capacities thereof to see if they will produce the predetermined desired capacity within the permissible variation therefrom before sealing the condenser 19. It is also to be understood that more than one auxiliary condenser 19 may be used to produce the desired capacity. In general the capacity of the auxiliary condenser will be small compared to the capacity of the main unit, and changes in the former due to sealing will not be sufficient to bring the total capacity outside of the required limits.

Although in the majority of cases a deficiency of capacity from the predetermined desired capacity occurs after the potting operation, cases will occur wherein the measured capacity of the potted condenser 10 is within the permissible variation from the desired capacity in which case no auxiliary condenser 19 is needed and the particular potted condenser is set to one side for completion.

The condenser is thereafter completed by securing a cap or cover (not shown) on the container 10 with the terminals 13 and 20 and 14 and 21 extending through apertures formed in the cover and connected in parallel to terminal clips fixed to the cover. The terminals of the condensers 10 and 19 are diagrammatically shown in Fig. 3 at 23 as connected in parallel without showing the cover for the sake of simplifying the disclosure of the invention.

Instead of inserting a bar, tube or hollow member closed at one end in the container 11, which upon withdrawal from the hardened compound will leave the space 18, a hollow member or shell 24 of a suitable dielectric material (Fig. 4) may be inserted in the container before the compound is poured thereinto, the shell 24 not being withdrawn as in the case of the bar, tube or hollow member closed at one end, but is left permanently therein. The member or shell 24 may be closed at its lower end or provided with a flange 25 which may be secured by adhesive or other suitable material to the inner surface of the bottom wall of the container 11 to position and support it while the compound is poured into the space surrounding it and to prevent the compound from filling the hollow thereof which receives the auxiliary condenser 19.

Although several methods have been described for practicing the invention, it will be understood that it is not limited to the details shown or the exact steps described or any particular order thereof, but is capable of modification and variation within the spirit of the invention and within the scope of the appended claims.

What is claimed is:

1. The method of producing an electrical impedance device of predetermined electrical characteristics which comprises sealing in a fluid compound a device having characteristics at variance with the predetermined characteristics, forming a space in the fluid compound alongside the device, permitting the compound to harden, measuring the characteristics of the device, inserting and sealing in the space an auxiliary device of electrical characteristics to produce by a combination of the devices the predetermined characteristics, and connecting the sealed devices.

2. The method of producing an electrical impedance device of predetermined electrical characteristics which comprises sealing a device having characteristics at variance with the predetermined characteristics and a hollow member in a fluid compound, permitting the compound to harden, measuring the characteristics of the device, inserting and sealing in the hollow of the member an auxiliary device of electrical characteristics to produce by a combination of the devices the predetermined characteristics, and connecting the sealed devices.

3. The method of producing an electrical impedance device of predetermined electrical characteristics which comprises sealing a device having characteristics at variance with the predetermined characteristics and a member in a fluid compound, permitting the compound to harden, removing the member from the hardened compound, measuring the characteristics of the device, inserting and sealing in the space formerly occupied by the member an auxiliary device of electrical characteristics to produce by a combination of the devices the predetermined characteristics, and connecting the sealed devices.

4. The method of producing a condenser of predetermined capacity which comprises sealing a condenser at variance with the predetermined capacity and a member in a fluid compound, permitting the compound to harden, removing the member from the hardened compound, measuring the capacity of the condensers, inserting and sealing in the space formerly occupied by the member an auxiliary condenser of sufficient capacity to produce by a combination of the condensers the predetermined capacity and connecting the sealed condensers.

5. The method of producing a condenser which comprises sealing a condenser unit in a compound, forming a space in the compound alongside said condenser unit, permitting the compound to harden, thereafter measuring the capacity of the condenser unit and sealing an auxiliary condenser in said space.

6. The method of producing a condenser having a capacity which is within predetermined close limits, which comprises sealing a condenser which is not within the capacity limits and a member in parallel spaced relationship in a fluid compound, permitting the compound to harden, removing the member from the hardened compound, measuring the capacity of the condenser, inserting and sealing in the space formerly occupied by the member an auxiliary condenser of sufficient capacity to bring the combined capacities of the condensers within the limits, and connecting the sealed condensers.

7. The method of producing a condenser having a capacity which is within predetermined limits which comprises sealing an under-capacity condenser and a member in a molten compound, permitting the compound to harden, heating the member to soften the compound contiguous thereto, removing the member from the compound, measuring the capacity of the condenser, inserting and sealing in the space formerly occupied by the member an auxiliary condenser of such a capacity as to bring the combined capacities of the condensers within the limits, and connecting the sealed condensers.

8. The method of producing a condenser of predetermined capacity which comprises sealing a condenser at variance with the predetermined capacity and a copper bar in a molten compound in a container, permitting the compound to harden, heating the copper bar to soften the compound contiguous thereto, removing the bar from the compound, measuring the capacity of the condenser, inserting and sealing in the space formerly occupied by the bar an auxiliary condenser of sufficient capacity to produce by a combination of the condensers the predetermined capacity, and connecting the sealed condensers.

9. A condenser comprising a container, a condenser unit therein, a shell parallel thereto within the container, a second condenser unit within said shell and in spaced relation therewith, and sealing compound surrounding said units and shell and filling the space within the shell.

10. A condenser comprising a container, a condenser unit therein, a shell within the container having a flange abutting an inner surface of the container, a second condenser unit within said shell, and sealing compound surrounding said units and shell.

FRANK W. TAYLOR.